June 18, 1957  B. C. HAYES  2,795,876
MOUNTING FOR SERVICE RIBBONS
Filed Dec. 10, 1954  2 Sheets-Sheet 1

INVENTOR
BURL C. HAYES

BY
ATTORNEY

June 18, 1957  B. C. HAYES  2,795,876
MOUNTING FOR SERVICE RIBBONS
Filed Dec. 10, 1954  2 Sheets-Sheet 2
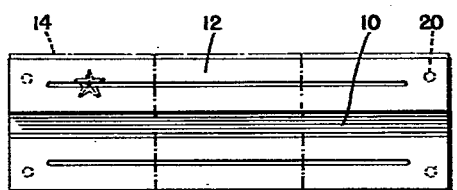
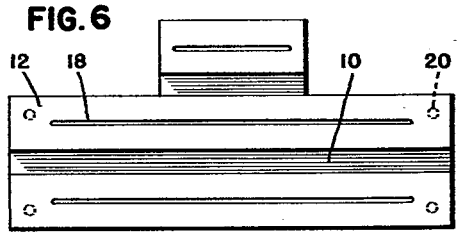
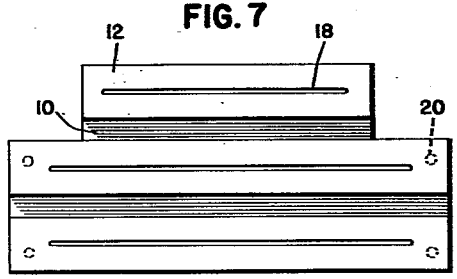
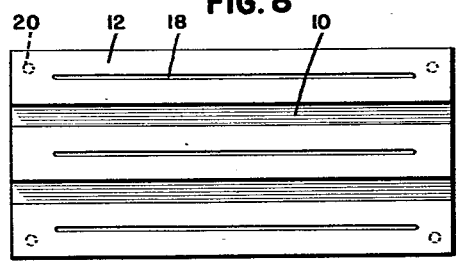
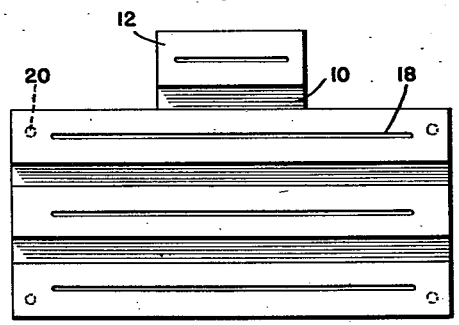
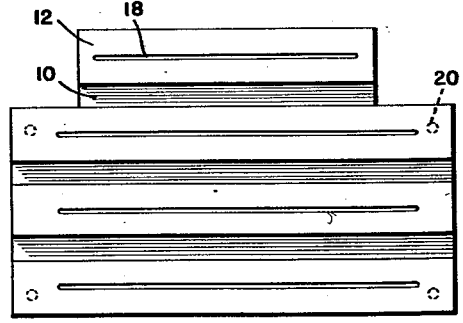
INVENTOR
BURL C. HAYES
BY
ATTORNEY United States Patent Office 2,795,876
Patented June 18, 1957

2,795,876

MOUNTING FOR SERVICE RIBBONS

Burl C. Hayes, Washington, D. C.

Application December 10, 1954, Serial No. 474,383

5 Claims. (Cl. 40—1.5)

This invention relates generally to a mount for service ribbons such as campaign ribbons, honors, awards, medals and the like. While various means are known for supporting such ribbons for service personnel, none have proved entirely adequate to all situations, and to date no fully satisfactory device has been developed.

The principal object of this invention, therefore, is to provide such a device which will meet all of the conditions required of it by the numerous service personnel who wear service ribbons, the device being adaptable to varying requirements.

Another object is to provide such a device in plastic material which can readily be molded or extruded and thus economically manufactured.

Still another object is to provide such a device which is rugged enough to withstand constant daily wear and handling.

A further object is to provide such a device upon which a ribbon or medal may be affixed, removed or rearranged with a minimum of effort, and which will in itself be substantially invisible when worn with service ribbons.

Still a further object is to provide such a device which may be sold as a unit comprising a plurality of rows of T-bars upon which service ribbons may be mounted, said T-bars being separable from one another along a frangible line provided between them, said separable units being re-unitable, when necessary, into a single unit having a plurality of T-bars by simple means readily available. An additional object is to provide a service ribbon mount adapted to support an odd or even number of service ribbons, with a minimum amount of the support visible beneath the ribbons.

Further objects will appear upon reference to the following specification and accompanying drawings which are illustrative of a preferred embodiment of the invention, and in which Figure 1 is a front perspective view of a service ribbon mount in accordance with the invention, illustrating the manner of application of a service ribbon thereto.

Figure 5 is a front elevation showing a mount having two rows of bars of equal length.

Figure 6 shows a similar view of a mount having, in addition, a partial upper row adapted to receive one service ribbon.

Figure 7 is a similar view in which the upper row is of a length adapted to support two service ribbons.

Figure 8 is a similar view, in which three rows of bars are provided, all of equal length, each adapted to support a plurality of service ribbons.

Figure 9 is a similar view, with an additional upper row of a length adapted to receive and support one service ribbon.

Figure 10 is a similar view showing an upper row adapted to support two service ribbons.

Figure 1:
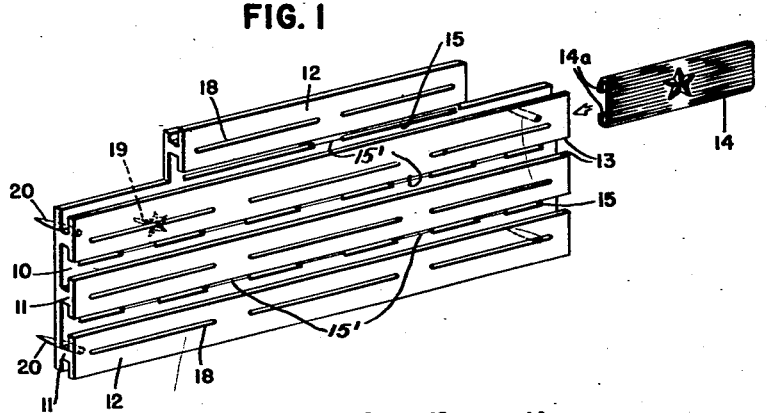

The mount comprises a baseplate 10 having a plurality of rows of elongated bars 11 which resemble a T in cross section, each T having a leg 11 and a crossbar 12. Each crossbar is spaced from the baseplate and from each other, the longitudinal edges 13 of the adjacent crossbars being spaced apart a distance just slightly more than twice the thickness of the average service ribbon 14 to be placed thereon. The purpose of this is to leave as little as possible of the mount itself visible beneath the service ribbons when the mount is worn.

The ribbon 14 is shown as a plate-like member which has its opposite longitudinal edges bent rearwardly upon itself to form flanges 14a, the flanges being spaced from the back of the plate. The ribbon is mounted upon the crossbar of the T by sliding the same edgewise thereon as indicated by the arrow in Figure 1, the flanges engaging the crossbar of the T with a frictional grip.

The baseplate 10 may be provided with a plurality of narrow, elongated slots 15 substantially midway between the legs 11, said slots extending across the length of the mount. The portions of the base between said slots may be weakened by a line 15' scored therein, or by other means, so that the rows of T bars may be separable from one another by breaking the baseplate along said frangible line.

Figure 2:
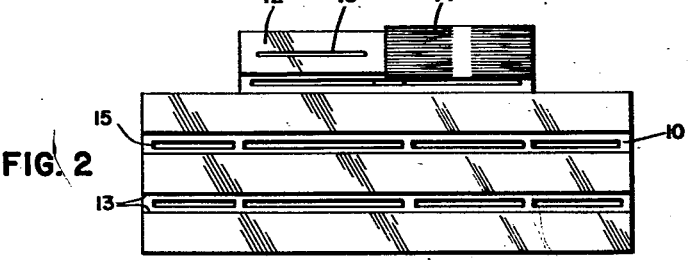
Figure 2 is a front elevation of the ribbon mount with one ribbon applied thereto.

The slots 15, as shown in Figure 2, may be made much greater in length than the portions of the baseplate left between the slots, so that the baseplate is sufficiently weakened along the line of slots to be frangible along that line without scoring.

Figure 3:
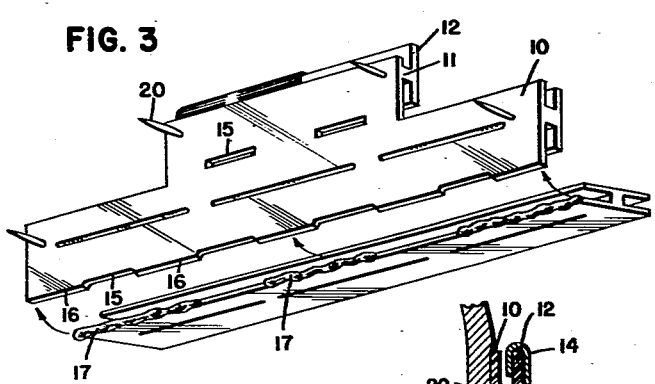
Figure 3 is a rear perspective view of the mount with a service ribbon applied thereto, showing a section broken off, with an adhesive applied to the edge of one of the parted sections.
Figure 4:
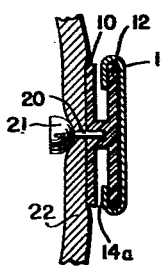
Figure 4 is vertical sectional view taken on the line 4—4 of Figure 2, showing the manner of the application of the mount to a garment.

The thickness of the baseplate 10 is such that adequate lands 16 are provided along the separated edges between the slots 18, as shown in Figure 3, so that if desired, the separated rows of T bars may be re-united and made into a unitary structure again by the application of a quick-setting plastic cement 17 to the lands of the complementary edges of the separated rows, and applying pressure to bring them together forcibly.

The crossbar of each T is provided with a slot 18 which extends completely through the leg 11 and baseplate 10. This slot is provided to receive the shank of a fastening member 19 of a star, oak leaf cluster or other emblem which is worn over the service ribbon. In practice, this fastening member, which has a sharpened point, is pushed through the ribbon and through the slot 19, being bent over where it extends through said slot. Or the slot may be made just wide enough to receive said shank with a tight friction fit.

The mount may be made in as many rows and in as many widths as desired, or different widths can be obtained on the same mount, so that an odd or even number of ribbons may be secured thereon.

For example, in Figure 2, the upper row shows a T-bar adapted to receive and support a plurality of ribbons, yet a lesser number than the subjacent row. Such a reduced upper row may be obtained by cutting down on the baseplate and T-bar to the line of slots 15 and then breaking off the waste portions along said line. The cutting may be done with a fine saw or other suitable instrument.

The entire mount is applied to the shirt or blouse by means of pins 20 and secured by a fastening device 21 fixed to the pins inside the garment 22 supporting the mount.

Minor changes in construction and design of the service ribbon mount may be made without departing from the spirit and scope of the invention as defined in the appended claims.

I claim:

1. A mount for service ribbons and the like comprising a unitary structure having a baseplate, at least two T-bars extending outwardly of said baseplate in spaced and parallel relation to each other and to said baseplate, said T-bars and baseplate having spaced slots, the slots in said T bars adapted to receive and frictionally support pin shank members extending therethrough, the slots in said baseplate providing a frangible line therefor.

2. A mount for service ribbons and the like comprising unitary structure having a baseplate, at least two T-bars extending outwardly of said baseplate in spaced and parallel relation, spaced slots extending longitudinally on said baseplate parallel to said T-bars and extending between them, the portions of said baseplate between said slots being scored to render them frangible along the line of said slots.

3. A mount for service ribbons and the like comprising a unitary structure having a baseplate, at least two T-bars extending outwardly of said plate and coextensive in length therewith, and lying in spaced and parallel relation to each other, one of said bars being of greater length than the other, spaced, aligned, elongated slots in said baseplate parallel to said T-bars and extending between them, said slots being of greater length than the intervening portions of the baseplate, whereby said baseplate is made frangible along the line of said slots.

4. A mount for service ribbons and the like comprising a baseplate, at least two T-bars extending outwardly of said baseplate in spaced and parallel relation, the thickness of the baseplate along a line between said T-bars being reduced in cross section to make said baseplate frangible along said line, the distance between the crossbars of said T's being slightly greater than twice the thickness of the service ribbons to be worn thereon.

5. A mount for service ribbons and the like comprising a unit of plastic material having a rigid baseplate, a plurality of T-bars, at least one of which is coextensive with said baseplate in length, said bars extending outwardly of the baseplate in spaced and parallel relation to one another, slots extending through each T and baseplate to receive and support pin shank members, spaced, lineal slots in said baseplate between said T-bars, said slots extending lengthwise of said baseplate, the portions of said baseplate between said slots being of less length than the length of said slots so as to form a weakened breaking line, said baseplate being frangible along said line of slots to form one or more individual service ribbon mounts, said individual mounts being reunitable into a unitary structure upon the application of an adhesive to the opposite edges of said baseplate along said line and the application of pressure to the separable parts.

References Cited in the file of this patent

UNITED STATES PATENTS

| | | |
|---|---|---|
| 2,313,723 | Adler | Mar. 16, 1943 |
| 2,357,231 | Sleeper | Aug. 29, 1944 |
| 2,464,395 | Hilborn | Mar. 15, 1949 |
| 2,551,539 | Horton | May 1, 1951 |
| 2,588,050 | Rutherford | Mar. 4, 1952 |
| 2,707,344 | Bolognese | May 3, 1955 |

FOREIGN PATENTS

| | | |
|---|---|---|
| 485,633 | France | Jan. 24, 1918 |